United States Patent
Rosenwinkel et al.

(10) Patent No.: US 8,676,490 B1
(45) Date of Patent: Mar. 18, 2014

(54) GEOPOSITION DETERMINATION FROM STAR AND SATELLITE OBSERVATIONS

(75) Inventors: Alan M. Rosenwinkel, Maple Shade, NJ (US); Carl V. Jannetti, Swedesboro, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 670 days.

(21) Appl. No.: 12/917,012

(22) Filed: Nov. 1, 2010

Related U.S. Application Data

(60) Provisional application No. 61/357,133, filed on Jun. 22, 2010.

(51) Int. Cl.
*G01C 15/00* (2006.01)
(52) U.S. Cl.
USPC .................. 701/408; 701/489; 701/482
(58) Field of Classification Search
None
See application file for complete search history.

(56) References Cited

U.S. PATENT DOCUMENTS

| | | | | | |
|---|---|---|---|---|---|
| 5,809,457 | A | * | 9/1998 | Yee et al. | 701/472 |
| 6,061,611 | A | * | 5/2000 | Whitmore | 701/4 |
| 6,158,694 | A | * | 12/2000 | Gowrinathan | 244/171 |
| 6,205,400 | B1 | * | 3/2001 | Lin | 701/472 |
| 6,246,960 | B1 | * | 6/2001 | Lin | 701/472 |
| 6,408,245 | B1 | * | 6/2002 | An et al. | 701/472 |
| 7,447,591 | B2 | | 11/2008 | Belenkii et al. | |
| 7,451,022 | B1 | | 11/2008 | Luk-Paszyc et al. | |
| 2005/0071055 | A1 | | 3/2005 | Needelman et al. | |
| 2007/0038374 | A1 | | 2/2007 | Belenkii et al. | |
| 2009/0177398 | A1 | | 7/2009 | Belenkii et al. | |

OTHER PUBLICATIONS

Ruiz, Andres, "Navigational Algorithms—Celestial Fix 2 LoP analytic solution", http://www.geocities.com/andresruizgonzalez.
Gubler, J. et al, "Differential Atmospheric Refraction and Limitations on the Relative Astrometric Accuracy of Large Telescopes", Publications of the Astronomical Society of the Pacific, 110:738-746, Jun. 1998.
Murtagh, F., "A New Approach to Point-Pattern Matching", Publications of the Astronomical Society of the Pacific, 104: 301-307, Apr. 1992.
U.S. Appl. No. 12/732,809, filed Mar. 26, 2010 entitled "Geoposition Determination by Starlight Refraction Measurement", in the name of Rosenwinkel.
U.S. Appl. No. 12/986,661, filed Jan. 7, 2011 entitled "Geoposition Determination Using Satellite Ephemerides", in the name of Rosenwinkel, et al.
Thomas, M. E., et al, "Astronomical Refraction", Johns Hopkins Apl Technical Digest, vol. 17, No. 3 (1996), pp. 279-284.

(Continued)

*Primary Examiner* — Thomas Tarcza
*Assistant Examiner* — Garrett Evans
(74) *Attorney, Agent, or Firm* — Howard IP Law Group, PC

(57) ABSTRACT

A method for geoposition determination from a platform involves using star observations to determine the orientation of the platform relative to an Earth-Centered Earth-Fixed (ECEF) frame. Observations are also made from the platform of azimuth, elevation, and possibly range of an orbiting Earth satellite. Platform orientation in an inertial frame fixed in time (IFFIT) is determined, and the satellite azimuth and elevation are transformed to the IFFIT. The satellite orbital ellipse is determined. Vectors extending from the platform frame to the foci of the ellipse are defined and converted into ECEF. The vector extending to the gravitational center of the Earth is identified and defines the location of the platform.

19 Claims, 4 Drawing Sheets

(56) References Cited

OTHER PUBLICATIONS

Liping, Z., et al, "Autonomous Orbit Determination for Earth Satellites by Starlight Atmospheric Refraction", College of Astronautics, Northwestern Polytechnical University, Xi'an, China.

Vittitoe, C.N., et al, "Analytic Fit of Deviation Caused by Atmospheric Refraction of Starlight as a Function of Space-Based Sensor Position", For Poster Session at the 1997 Infrared Information Symposia Specialty Group on Targets, Backgrounds and Discrimination Space Surveillance, Johns Hopkins University Appied Physics Laboratory, Laurel, Maryland, Jun. 4-5, 1997.

"Stellar Aberration", http:/.www.mathpages.com/rr/s2-05/2-05.htm, Sep. 8, 2009, pp. 1-13.

"The Celestial Sphere: How do astronomers keep track of the sky when the earth is constantly moving?", http://www.astro.cornell.edu/academics/courses/astro201/cel_sphere.htm, pp. 1-2.

"The Celestial Sphere", http://csep10.phys.utk.edu/astr161/lect/celestial/celestial.html, pp. 1-3.

Mangum, J., "Atmospheric Refractive Signal Bending and Propagation Delay", pp. 1-27.

"Astronomical Information Sheet No. 66", prepared by HM Nautical Almanac Office, The United Kingdom Hydrographic Office, Crown Copyright 2007.

\* cited by examiner

GEOPOSITION DETERMINATION FROM STAR AND SATELLITE OBSERVATIONS

This application claims the benefit of the priority date of Provisional application 61/357,133 filed Jun. 22, 2010 in the name of Rosenwinkel et al.

This invention was made with Government Support under Contract No. N00024-03-C-6110 awarded by the Department of the Navy. The Government has certain rights in this invention.

BACKGROUND

It is necessary for many military and nonmilitary purposes to know the geolocation of a vehicle. This is normally accomplished by use of a GPS system, but it is recognized that GPS may not always be available. A method is desired to accurately determine geoposition of a vehicle by means other than GPS.

SUMMARY

A method is for determining the position of a movable platform. The method comprises the step of observing the azimuth and elevation of a plurality of stars from the platform. If only two stars are observed, they should ideally have an included angle of 90°. The measured azimuth and elevation of the stars is used to determine the orientation of the platform in an Earth-Centered Earth-Fixed (ECEF) frame. The method also includes the step of observing the azimuth and elevation of an Earth satellite from the platform, and converting the azimuth and elevation of the Earth satellite in platform coordinates to corresponding coordinates in an inertial frame fixed in time. From the corresponding coordinates, a best-fit ellipse in an inertial frame fixed in time is determined. The method includes the further step of determining, in the inertial frame fixed in time, the vectors extending from the platform frame to the foci of the ellipse. The vectors extending from the platform frame to the foci of the ellipse are converted to the ECEF frame, and that vector extending from the platform frame to that focus lying at the gravitational center of the Earth is identified, to thereby establish the position.

Another method is for determining the position of an observer. The method comprises the steps of observing the azimuth and elevation position of an earth satellite to generate a succession of satellite positions in the frame of the observer's platform. A determination is made of the range of the satellite at the observed satellite positions in the frame of, or from the observer's platform. Measurement(s) is or are made of the position and orientation of the observer's platform relative to an inertial frame fixed in time. Ideally, the measurement(s) are made at the time each of the satellite azimuth and elevation measurements are made. These measurements of position and orientation may be made using an inertial navigation system, for example. Coordinate transformations are applied to each of the azimuth and elevation measurements from coordinates of the observer's platform to coordinates of an inertial frame fixed in time. That ellipse is calculated which best matches or is a best fit to the measured satellite coordinates in the inertial frame. A determination is made of vectors extending from the platform to the foci of the ellipse. The vectors extending from the platform frame to the foci of the ellipse are converted to the ECEF frame, and that vector extending from the platform frame to that focus lying at the gravitational center of the Earth is identified, to thereby establish the position. In a mode of this method, the step of measuring the orientation of the observer's platform relative to an inertial frame fixed in time comprises the steps of (a) observing the azimuth and elevation of at least two stars, (preferably at 90 degrees or at least not at 0 degrees) in the platform frame. The observations of the stars are preferably concurrent or simultaneous. Coordinate transformations are applied to each of the azimuth and elevation measurements of the stars from platform coordinates to coordinates of an inertial frame fixed in time. In this mode, the step of calculating that ellipse comprises the step of using the Levenberg-Marquardt nonlinear fit algorithm to minimize the sum of the squares of the residual. This mode may include the further step, following the step of resolving the ambiguity (328) to thereby determine the geolocation in the ECEF frame, of making the geolocation available to a user apparatus. The user apparatus may be a ship autonomous navigation system.

A method according to an aspect of the disclosure is for determining the position of an observer. The method comprises the steps of observing the azimuth and elevation position of an earth satellite from the observer's platform to generate a succession of satellite positions. The ranges of the satellite at the various positions are determined. The platform orientation relative to a fixed coordinate frame is measured, as for example by using an inertial navigation system. Each of the azimuth and elevation measurements, and possibly the range measurements, made from platform coordinates are transformed to coordinates of an inertial frame fixed in time. That ellipse is calculated which best matches the measured satellite coordinates in the inertial frame. Vectors are determined extending from the platform to the foci of the ellipse. The orientation of the platform is determined relative to Earth-Centered Earth-fixed (ECEF). The vectors extending from the platform to the two foci of the ellipse are converted into the ECEF frame. The geoposition of the ship is defined by that one of these two vectors associated with the focus that lies at the center of the earth, which may result in an ambiguity if the two foci are not easily distinguishable. The ambiguity is resolved. In a particular mode of the method according to the disclosure, the step of determining the platform orientation relative to the celestial frame may comprise the steps of observing the azimuth and elevation of at least two stars in the platform frame. In this particular mode, coordinate transformations are applied to each of the azimuth and elevation measurements, in order to transform from platform coordinates to coordinates of an inertial frame fixed in time. In another mode of the method, the step of calculating that ellipse comprises the step of using the Levenberg-Marquardt nonlinear fit algorithm to minimize the sum of the squares of the residual.

DETAILED DESCRIPTION

It is known that geoposition (position on or near the Earth's surface) of a vehicle such as a ship or automobile can be calculated from the Earth-Centered-Earth-Fixed (ECEF) attitude of the vehicle's or observer's coordinate frame or platform, together with a vector from the vehicle's coordinate frame to the center of the Earth. It is also known that the ECEF attitude of a platform can be measured using a star tracker.

The orbits of satellites are perturbed as they travel around the Earth, as for example by atmospheric drag and solar winds. Predictions of the positions of satellites as a function of time are therefore updated periodically to account for these effects. These corrections may be as much as many hours old when they become available, and thus satellite positions may not be exactly known even with the latest position update. Consequently, the satellite position predictions can be in error by many kilometers. However, during a single overhead pass of a given satellite, the trajectory will follow a nearly-perfect elliptical path, which is different from the predicted elliptical path. According to an aspect of the disclosure, the fact that the path is a nearly perfect ellipse may be used to assist in geolocation, even though the ellipse is not known in ECEF coordinates.

Figure 1:
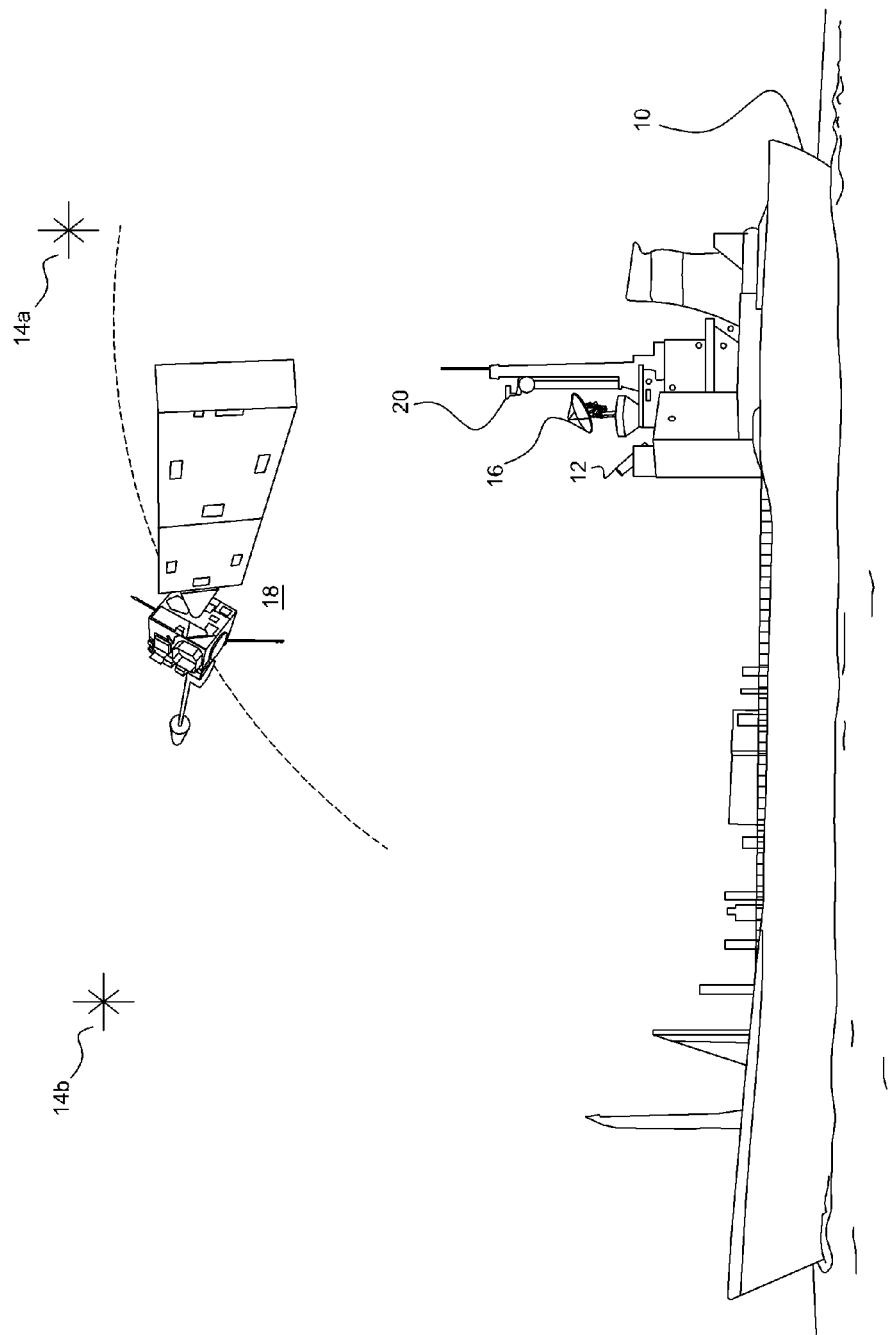
FIG. 1 is a simplified diagram of a ship fitted with a celestial telescope and a radar system, and also illustrating an Earth satellite in orbit at a location visible from the ship.

FIG. 1 illustrates a vehicle illustrated as a ship 10 fitted with a telescope or electro-optical sensor 12 suitable for determining the azimuth and elevation of stars visible from the ship's location. Representative stars are illustrated as 14a and 14b. Ideally, ship 10 also carries a radar system illustrated as 16, and an automatic navigation system illustrated as 20. The radar system can be used to determine the general location of an Earth-orbiting satellite 18, and also to determine its range. Ship 10 must also have a device for determining the azimuth and elevation, relative to the ship platform, of the satellite 18. This device may be the same an optical device such as the telescope 12, or may be another device such as a radar system. While a ship is illustrated and described, it will be clear that any vehicle can be used.

Figure 2:
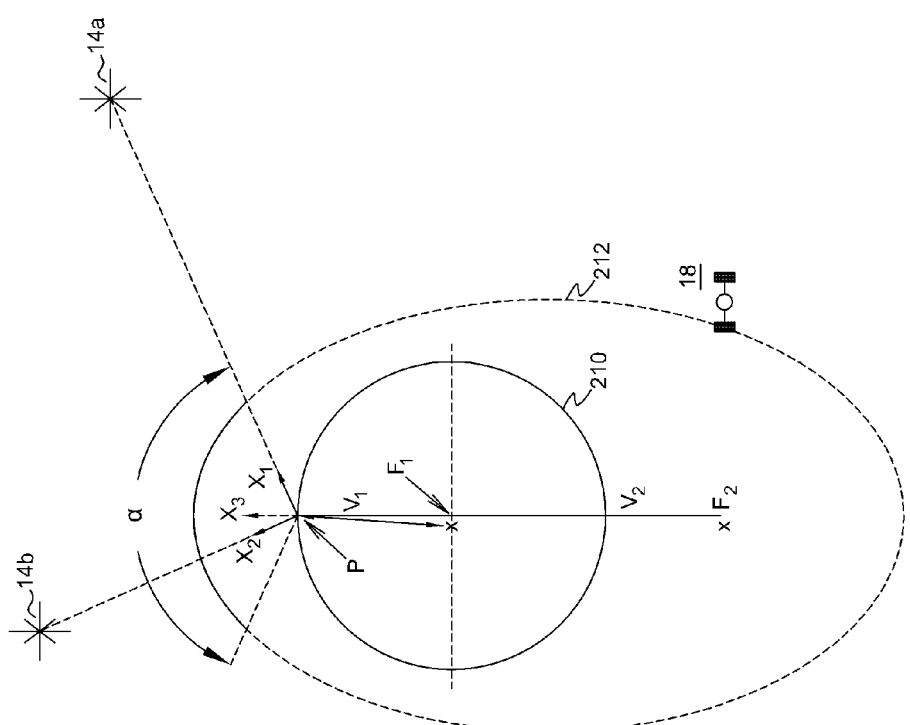
FIG. 2 is a simplified logic or control flow diagram or chart illustrating steps according to aspects of the disclosure.

FIG. 2 illustrates the scenario of FIG. 1 on a larger scale. In FIG. 2, the ship (10 of FIG. 1) is located at a point P on the Earth's surface 210. The generally elliptical orbit of satellite 18 is illustrated by dash line 212. Satellite 18 is visible from ship position P over a subtended angle illustrated as alpha ($\alpha$). Certain stars, illustrated as 14a and 14b, are also visible from ship location P. Ideally, these stars are selected to have an included angle of 90° as seen from the ship.

Figure 3:
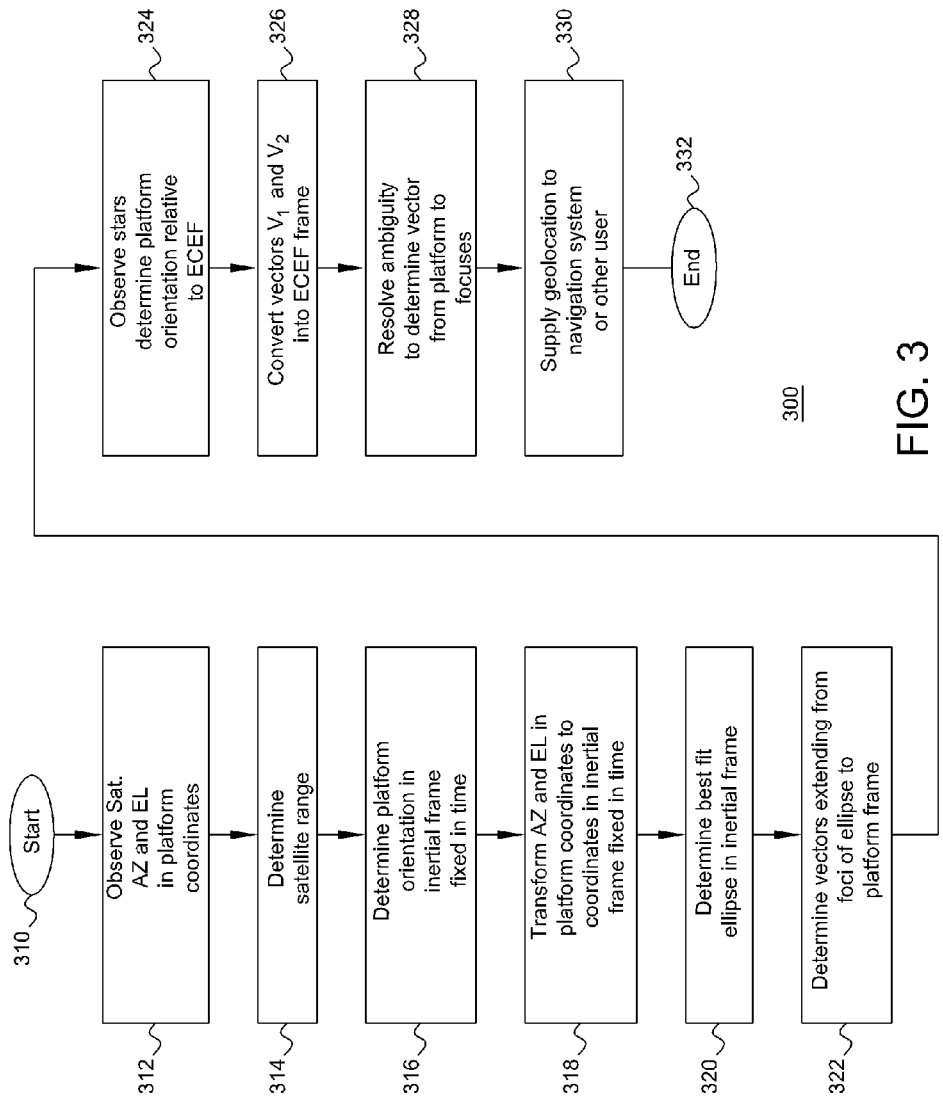
FIG. 3 is a simplified diagram illustrating satellite orbital motions.

According to an aspect of the disclosure, star and satellite position measurements are used to determine the position of the ship. FIG. 3 is a simplified logic or control flow 300 illustrating steps of a method, including computer processing steps, according to the disclosure. In FIG. 3, the logic begins at a START block 310 and flows to a block 312. Block 312 represents observations of the azimuth and elevation of satellite 18 in the ship or platform coordinates. These observations use the telescope 12 of FIG. 1, and can only be accomplished during those times in which the satellite 18 is in view, corresponding to the region included in angle $\alpha$. The logic 300 flows from block 312 to a block 314. Block 314 represents determination of the range of the satellite. This step is performed by the radar 16 of FIG. 1. The result of the operations in blocks 312 and 314 is generation of a series of measurements of the time-position or track of satellite 18 as measured from the ship 10 platform. From block 314 of FIG. 3, the logic 300 flows to a block 316. Block 316 represents determination of the position and orientation of the ship platform relative to an inertial frame fixed in time, as by use of an inertial navigation system, at each instant in time for which azimuth, elevation and range of the satellite are measured. This fixed coordinate frame may be the platform frame at a fixed moment in time.

From block 316 of FIG. 3, the logic 300 flows to a block 318, which represents the transformation of each of the azimuth and elevation measurements, and possibly the range measurement, made from platform coordinates to coordinates of the inertial frame fixed in time. From block 318, logic 300 flows to a block 320, which represents the determination of the equation of an ellipse in the inertial frame which is a best fit to the measurements of the satellite track. The Levenberg-Marquardt nonlinear fit algorithm may be used to minimize the sum of the squares of the residuals, where the "residuals" are well known in statistical analysis. Once the parameters of the satellite orbital ellipse (212 of FIG. 2) are determined in block 320, the positions F1 and F2 of the foci of the ellipse are also known in the inertial frame. Focus F1 is effectively at the center of mass of the Earth, and focus F2 is not. Foci F1 and F2 may lie near each other, and may not be widely separated as suggested in FIG. 2. This may make it difficult to distinguish between F1 and F2, potentially leading to ambiguity and error.

From block 320, the logic 300 of FIG. 3 flows to a block 322, which represents the determination of vectors V1 and V2 extending from the ship's platform frame to foci F1 and F2, respectively. Vectors V1 and V2 are illustrated in FIG. 2. This determination is an algebraic manipulation of the equation of the ellipse. The next step in the logic 300 is represented by block 324, which represents the determination of the orientation of the ship platform in relation to an Earth-Centered, Earth-Frame (ECEF) frame. This is accomplished by observation of stars such as stars 14a and 14b with the telescope of FIG. 1, and by use of known celestial navigation algorithms, such as the Celestial Fix 2 LoP method described in an article by Andrés Ruiz. Block 326 represents the conversion of the vectors V1 and V2 into the ECEF frame by simple algebraic manipulation. The presence of two vectors in close proximity may give rise to an ambiguity. Block 328 represents identification of that vector V1 extending to the focus F1 located at the center of the earth. This is accomplished by either choosing the focus F1 which most closely corresponds to an existing position estimate or by repeating the process for a second satellite and choosing the common focus between the two satellite calculations. Vector V1 is the ship's geolocation in ECEF.

The geoposition information can be displayed on a computer screen for a user to read or provided digitally to a computer system for other uses which rely on geoposition, as suggested by block 330 of FIG. 3. Such an other computer system might be, for example, a ship autonavigation system which controls the ship to follow a predetermined track. End block 332 represents the end of the method, but of course the geoposition may be determined again by again starting at START block 310.

It would be advantageous to be able to rely on GPS for determining location of a moving platform, but GPS is potentially subject to unavailability. In the absence of GPS, dead reckoning can be used in a system in which measurements can be made of translational acceleration and angular rotation rates. Dead reckoning, however, is subject to drift errors over time, and as such can be used only over short time periods. Another method having a long history of use for position determination is that of celestial observations for determining star altitudes from the horizon to compute lines of positions, the intersections of which define an estimate of the ship position. The celestial observation method requires either a visual measurement of the horizon or inertial measurement of the local gravity vector as a benchmark for all celestial observations, and therefore tends to be inaccurate on a moving platform. Position of a moving platform may also be calculated by triangulation of an observer's position from three or more satellite position measurements, but this method requires absolute knowledge of the positions of the satellites, while the method according to aspects of the disclosure does not so require.

Figure 4:
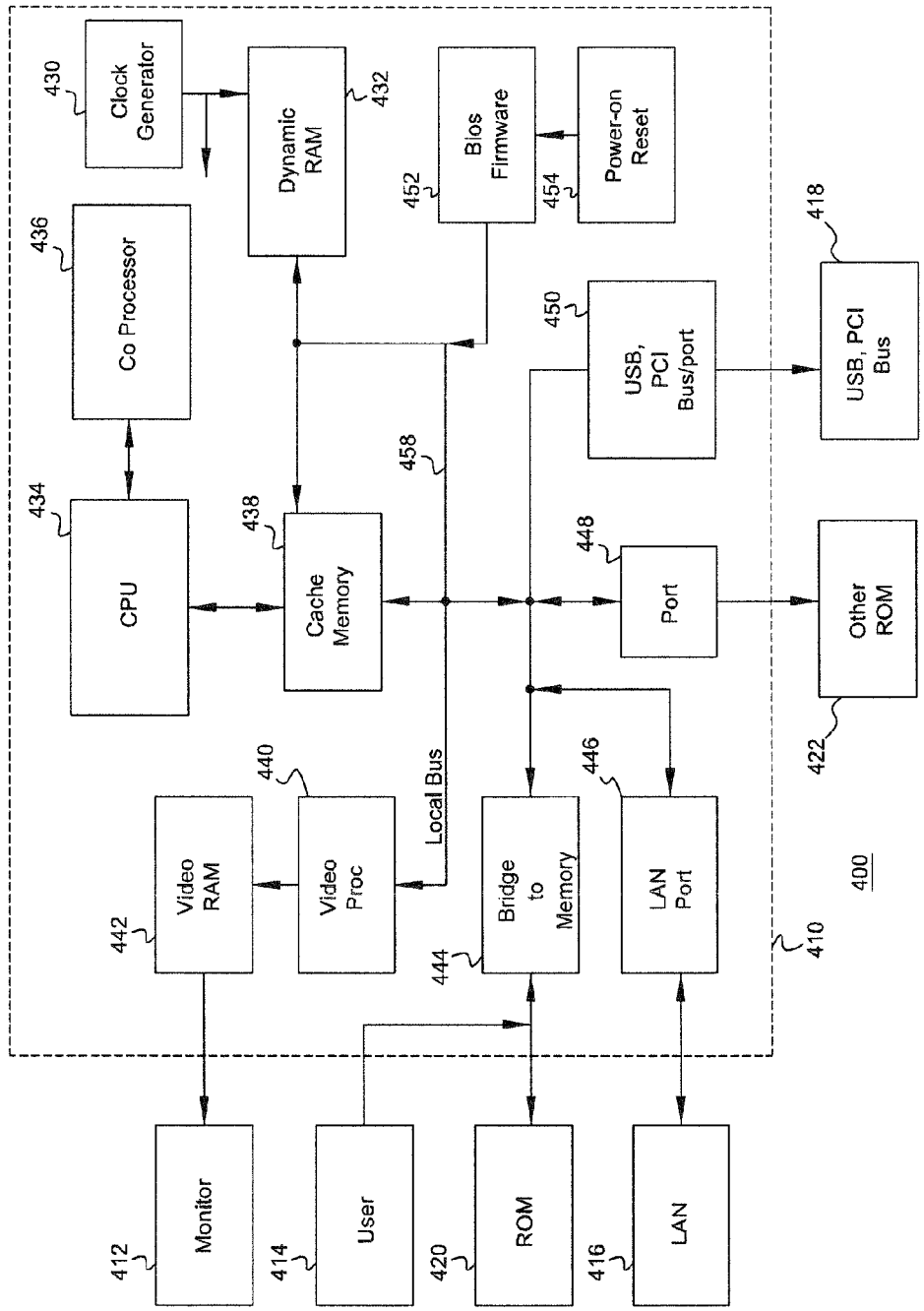
FIG. 4 is a simplified block diagram of a computer which may be used in conjunction with the arrangement of FIG. 1 to perform computations according to aspects of the disclosure.

FIG. 4 is a simplified diagram in block and schematic form illustrating a representative computer 400 which may be used in conjunction with the arrangement of FIG. 1 to perform computations for navigation system 20 and for calculations according to aspects of the disclosure. In FIG. 4, computer 400 includes a processor or board 410 and outboard elements such as a monitor 412, user controls such as a keyboard and or mouse, illustrated as a block 414, local area network (LAN) 416, additional buses 418 such as PCI and or USB, and read-only memory (ROM) 420, which is ordinarily a hard drive, and additional ROM 422, which may be, for example, a flash memory stick or capacitance disk (CD). The main portion of the computer processor or board 410 includes a central processing unit (CPU) 434, which communicates with a cache dynamic memory 438. At initial turn-on of the computer 400, a power-on reset illustrated as a block 454 enables a preloaded basic input/output system (BIOS) flash memory, which loads cache 438 with information that initializes the booting sequence by the CPU. When booted, CPU 434 may communicate with a coprocessor illustrated as 436, and also communicates with main dynamic memory (DRAM) 432 and a local bus 458. Local bus 458 provides communication between the CPU and other elements of the computer, as for example the video processor 440 and video random-access memory 442 for driving a monitor. Local bus 458 also communicates by way of a bridge 444 to external ROM 420 and to user controls 418. Local bus 458 further communicates by way of a port 448 with other ROM 422 if desired, by way of a USB or PCI bridge or port 450 with external buses, and or by way of a local area network (LAN) port 446 with a LAN 416. Those skilled in the art will understand how to use one or more computers to perform the processing required by elements of the disclosure.

A method according to an aspect of the disclosure is for determining the position of a movable platform. The method comprises the step of observing (324) the azimuth and elevation of a plurality of stars from the platform. If only two stars are observed, they should ideally have an included angle of 90°. The measured azimuth and elevation of the stars is used to determine the orientation of the platform in an Earth-Centered Earth-Fixed (ECEF) frame. The method also includes the step of observing (312, 314, 316) the azimuth, elevation, and range of an Earth satellite (18) from the platform, and converting (318) at least the azimuth and elevation measurements, and possibly the range measurement, of the Earth satellite (18) in platform coordinates to corresponding coordinates in an inertial frame fixed in time. From the corresponding coordinates, a best-fit ellipse (212) in an inertial frame fixed in time is determined (320). The method includes the further step of determining (322), in the inertial frame fixed in time, the vectors (V1, V2) extending from the platform frame to the foci (F1, F2) of the ellipse (212). The vectors (V1, V2) extending from the platform frame to the foci (F1, F2) of the ellipse (212) are converted (326) to the ECEF frame, and that vector extending from the platform frame to that focus lying at the gravitational center of the Earth is identified (328), to thereby establish the position.

A method according to another aspect of the disclosure is for determining the position of an observer. The method comprises the steps of observing (312) the azimuth and elevation position of an earth satellite (18) to generate a succession of satellite positions in the frame of the observer's platform. A determination is made of the range (314) of the satellite at the observed satellite positions in the frame of the observer's platform. A measurement is made (316) of the orientation of the observer's platform relative to an inertial frame fixed in time. This measurement of the orientation may be made using an inertial navigation system, for example. Coordinate transformations (318) are applied to each of the azimuth and elevation measurements, and possibly to the range measurements, from coordinates of the observer's platform to coordinates of an inertial frame fixed in time. That ellipse (212) is calculated (320) which best matches or is a best fit to the measured satellite coordinates in the inertial frame. A determination (322) is made of vectors (V1, V2) extending from the platform to the foci (F1, F2) of the ellipse (212). The orientation of the platform relative to an Earth-centered Earth-fixed (ECEF) frame is determined (324). The vectors (V1, V2) extending from the platform to the foci (F1, F2) of the ellipse are converted (326) into the ECEF frame, which may yield an ambiguous result. The ambiguity is resolved (328) to thereby determine the geolocation in the ECEF frame. In a mode of this method, the step (316) of measuring the orientation of the observer's platform relative to an inertial frame fixed in time comprises the steps of (a) observing the azimuth and elevation of at least two stars, (preferably at 90 degrees or at least not at 0 degrees) in the platform frame. The observations of the stars are preferably concurrent or simultaneous. Coordinate transformations are applied to each of the azimuth and elevation measurements of the stars from platform coordinates to coordinates of an inertial frame fixed in time. In this mode, the step of calculating that ellipse (320) comprises the step of using the Levenberg-Marquardt nonlinear fit algorithm to minimize the sum of the squares of the residual. This mode may include the further step, following the step of resolving the ambiguity (328) to thereby determine the geolocation in the ECEF frame, of making the geolocation available to a user apparatus. The user apparatus may be a ship autonomous navigation system.

What is claimed is:

1. A computer implemented method for determining the position of a movable platform, said method comprising the steps of:

measuring the azimuth and elevation of a plurality of stars from said platform, and using the measured azimuth and elevation of said stars to determine the orientation of said platform in an Earth-Centered Earth-Fixed coordinate frame;

determining a series of platform coordinates of at least the azimuth and elevation of a satellite from said platform, and converting said series of azimuth and elevation determinations of said satellite in the platform coordinates to corresponding coordinates in an inertial frame fixed in time;

determining from said corresponding coordinates a best-fit ellipse in said inertial frame fixed in time;

determining, in said inertial frame fixed in time, vectors extending from said platform frame to foci of said ellipse;

converting said vectors extending from said platform frame to said foci of said ellipse to said Earth-Centered Earth-Fixed coordinate frame, and identifying a vector extending from said platform frame to a focus lying at the gravitational center of the Earth to thereby establish the position of said platform.

2. A computer implemented method according to claim 1, wherein said step of determining said series of platform coordinates of the azimuth and elevation of a satellite includes the step of measuring platform coordinates of the azimuth and elevation of an Earth satellite.

3. A computer implemented method for determining the position of an observer on a platform, said method comprising the steps of:
   observing the azimuth and elevation position of a satellite to generate a succession of satellite positions in the coordinate frame of the observer's platform;
   determining the range of said satellite at said positions in said coordinate frame of the observer's platform;
   measuring the position and orientation of the observer's platform relative to an inertial frame fixed in time;
   applying coordinate transformations to each of said azimuth and elevation measurements from said coordinate frame of said observer's platform to coordinates of said inertial frame fixed in time;
   calculating an ellipse which best matches the measured satellite coordinates in said inertial frame fixed in time;
   determining the vectors extending from said platform to foci of said ellipse;
   determining the orientation of said platform relative to an Earth-centered Earth-fixed (ECEF) frame;
   converting said vectors extending from said platform to said foci of said ellipse into said ECEF frame, which may result in ambiguity; and
   if an ambiguity is present, resolving said ambiguity to thereby determine the geolocation in said ECEF frame.

4. A computer implemented method according to claim 3, wherein said step of observing the azimuth and elevation position of a satellite to generate a succession of satellite positions in the coordinate frame of the observer's platform includes the step of observing the azimuth and elevation position of an Earth satellite to generate a succession of satellite positions in the coordinate frame of the observer's platform.

5. A computer implemented method according to claim 3, wherein:
   said step of converting said vectors extending from said platform to said foci of said ellipse into said Earth-Centered Earth-Fixed coordinate frame comprises the step of converting said vectors extending from said platform to said foci of said ellipse into said Earth-centered Earth-fixed frame; and
   said step of resolving said ambiguity includes the step of determining said geolocation in said Earth-centered Earth-fixed frame.

6. A computer implemented method according to claim 3, wherein said step of measuring the orientation of the observer's platform relative to an inertial frame fixed in time comprises the steps of:
   measuring the azimuth and elevation of at least two stars in said platform frame; and
   applying coordinate transformations to each of said azimuth and elevation measurements of said stars from platform coordinates to coordinates of said inertial frame fixed in time.

7. A computer implemented method according to claim 3, wherein said step of measuring the position and orientation of the observer's platform relative to an inertial frame fixed in time is performed concurrently with said step of observing the azimuth and elevation position of a satellite.

8. A computer implemented method according to claim 3, wherein said step of calculating an ellipse which best matches the measured satellite coordinates in said inertial frame fixed in time comprises the step of using the Levenberg-Marquardt nonlinear fit algorithm to minimize the sum of the squares of the residual.

9. A computer implemented method according to claim 3, further comprising, following said step of resolving said ambiguity to thereby determine the geolocation, the step of;
   making said geolocation available to a user apparatus.

10. A computer implemented method according to claim 9, wherein said step of making said geolocation available to a user apparatus includes the step of making said geolocation available to an autonomous navigation system.

11. A method for determining geoposition of a ship platform at sea, said ship platform being fitted with at least one optical device for determining the azimuth and elevation of stars, said method comprising the steps of:
    measuring the azimuth and elevation of a plurality of stars from said optical device, and using the measured azimuth and elevation of said stars to determine the orientation of said ship platform in coordinates of an Earth-centered Earth-fixed coordinate frame;
    measuring at least azimuth and elevation coordinates of an Earth satellite in said platform coordinates, and converting said azimuth and elevation measurements of said Earth satellite from platform coordinates to corresponding coordinates in an inertial frame fixed in time;
    determining from said corresponding coordinates a best-fit ellipse in said inertial frame fixed in time;
    determining, in said inertial frame fixed in time, vectors extending from said platform frame to foci of said ellipse;
    converting said vectors extending from said platform frame to said foci of said ellipse to said Earth-Centered Earth-Fixed coordinate frame, and identifying that vector extending from said platform frame to that focus lying at the gravitational center of the Earth to thereby establish the position of said platform.

12. A method according to claim 11, wherein:
    said step of using the measured azimuth and elevation of said stars to determine the orientation of said ship in coordinates of an Earth-centered Earth-fixed coordinate frame includes the step of determining the orientation of said ship in coordinates of an Earth-Centered Earth-Fixed frame (ECEF); and
    said step of converting said vectors extending from said platform frame to said foci of said ellipse to said Earth-centered Earth-fixed coordinate frame comprises the step of converting said vectors extending from said platform frame to said foci of said ellipse to said Earth-centered Earth-fixed frame.

13. A method according to claim 12, further comprising the step of providing a radar system on said platform, and further comprising the step, in conjunction with said step of observing at least azimuth and elevation coordinates of an Earth satellite in said platform coordinates, of:
    using said radar system to determining satellite range.

14. A method for determining geoposition of a ship at sea, said ship being fitted with at least a radar system and at least one optical device for determining the azimuth and elevation of stars, said method comprising the steps of:
    measuring the azimuth and elevation of a plurality of stars using said optical device, and using the measured azimuth and elevation of said stars to determine the orientation of a ship platform in an Earth-Centered Earth-Fixed coordinate frame (ECEF);
    measuring coordinates of at least the azimuth and elevation of an Earth satellite from said platform, and converting said azimuth and elevation of said Earth satellite from platform coordinates to corresponding coordinates in an inertial frame fixed in time;
    determining satellite range using said radar system;

determining from said corresponding coordinates a best-fit ellipse in said inertial frame fixed in time;

determining, in said inertial frame fixed in time, vectors extending from said platform frame to foci of said ellipse;

converting said vectors extending from said platform frame to said foci of said ellipse to said Earth-Centered Earth-Fixed coordinate frame, and identifying that vector extending from said platform frame to that focus lying at the gravitational center of the Earth to thereby establish the position of said ship.

15. A system for geolocation of a ship, said system comprising:

a star measuring apparatus mounted on said ship, configured for measuring the azimuth and elevation of a plurality of stars from said ship:

a first processing arrangement coupled to said star measuring apparatus, configured for using said the measured azimuth and elevation of said stars to determine the orientation of said ship in Earth-centered Earth-fixed coordinates;

a satellite measuring apparatus mounted on said ship, configured for measuring at least the azimuth and elevation of a satellite in ship local coordinates;

a second processing arrangement coupled to said satellite measuring apparatus, configured for converting said azimuth and elevation of said satellite in said ship local coordinates to corresponding coordinates in an inertial frame fixed in time;

a third processing arrangement configured for calculating, from said corresponding coordinates, a best-fit ellipse in said inertial frame fixed in time;

a fourth processing arrangement configured for calculating, in said inertial frame fixed in time, vectors extending from said ship local coordinates to foci of said ellipse;

a fifth processing arrangement configured for converting said vectors extending from said ship local coordinates to said foci of said ellipse to said Earth-centered Earth-fixed coordinates, and for identifying a vector extending from said platform frame to a focus lying at the gravitational center of the Earth to thereby establish the position of said ship.

16. A system for determining the position of a platform, said system comprising:

a satellite measuring apparatus mounted on said platform configured for measuring the azimuth and elevation positions of a satellite to generate a succession of satellite positions in a coordinate frame of said platform;

a radar system mounted on said platform, configured for determining the range of said satellite at said positions in said coordinate frame of said platform;

a first processor arrangement configured for determining, from said positions and said ranges of said satellite, the orientation of said platform relative to an inertial frame fixed in time;

a second processing arrangement configured for applying coordinate transformations to each of said azimuth and elevation measurements from said coordinate frame of said platform to coordinates of said inertial frame fixed in time;

a third processing arrangement configured for calculating, from said positions and said ranges of said satellite, an ellipse which best matches the measured satellite azimuth and elevation in said inertial frame fixed in time;

a fourth processing arrangement configured for determining the vectors extending from said platform to foci of said ellipse;

a fifth processing arrangement configured for determining the orientation of said platform relative to an Earth-centered Earth-fixed coordinate frame;

a sixth processing arrangement configured for converting said vectors extending from said platform to said foci of said ellipse into said Earth-centered Earth-fixed coordinate frame, which may result in ambiguity, and for, if said ambiguity is present, resolving said ambiguity to thereby determine the geolocation in said Earth-centered Earth-fixed coordinate frame.

17. A system according to claim 16, wherein said third processing arrangement configured for calculating, from said positions and said ranges of said satellite, an ellipse, further includes a further processing arrangement configured for calculating using the Levenberg-Marquardt nonlinear fit algorithm to minimize the sum of the squares of the residual.

18. A system according to claim 16, further comprising a navigation apparatus coupled to said sixth processing arrangement configured for using said geolocation.

19. A system for determining geoposition of a ship at sea, said system comprising:

a radar system mounted on said ship, configured for determining the range from said ship to an Earth satellite in ship local coordinates;

at least one optical device mounted on said ship, configured for determining the azimuth and elevation of said Earth satellite and of a plurality of stars in ship local coordinates;

a first processing arrangement configured for using the measured azimuth and elevation of said stars to determine the orientation of said ship in an Earth-Centered Earth-Fixed coordinate frame (ECEF);

a second processing arrangement configured for converting said azimuth and elevation of said Earth satellite from said ship local coordinates to corresponding coordinates in an inertial frame fixed in time;

a third processing arrangement configured for determining, from said corresponding coordinates, a best-fit ellipse in said inertial frame fixed in time;

a fourth processing arrangement configured for determining, in said inertial frame fixed in time, vectors extending from said ship local coordinates to foci of said ellipse; and a fifth processing arrangement configured for converting said vectors extending from said ship local coordinates to said foci of said ellipse to said Earth-Centered Earth-Fixed coordinate frame, and identifying that vector extending from said ship local coordinates to that focus lying at the gravitational center of the Earth, to thereby establish the position of said ship.

* * * * *